United States Patent
Zhao (10) Patent No.: US 12,526,696 B2
(45) Date of Patent: Jan. 13, 2026

(54) SIDELINK COMMUNICATION METHODS, SIDELINK COMMUNICATION APPARATUS, AND STORAGE MEDIUM

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 376 days.

(21) Appl. No.: 18/004,266

(22) PCT Filed: Aug. 26, 2020

(86) PCT No.: PCT/CN2020/111521
§ 371 (c)(1),
(2) Date: Jan. 4, 2023

(87) PCT Pub. No.: WO2022/041008
PCT Pub. Date: Mar. 3, 2022

(65) Prior Publication Data
US 2023/0345309 A1    Oct. 26, 2023

(51) Int. Cl.
*H04W 28/26* (2009.01)
*H04W 76/14* (2018.01)
(Continued)

(52) U.S. Cl.
CPC .......... *H04W 28/26* (2013.01); *H04W 76/14* (2018.02); *H04W 76/23* (2018.02); *H04W 72/25* (2023.01); *H04W 72/40* (2023.01)

(58) Field of Classification Search
CPC ..... H04W 28/00; H04W 28/02; H04W 28/06; H04W 76/20; H04W 76/23; H04W 76/00;
(Continued)

(56) References Cited

U.S. PATENT DOCUMENTS

2012/0008571 A1* 1/2012 Li ................... H04W 74/0825
370/329
2017/0141861 A1* 5/2017 Zhang .................. H04W 4/40
(Continued)

FOREIGN PATENT DOCUMENTS

CN    106465061 A    2/2017
CN    106937380 A    7/2017
(Continued)

OTHER PUBLICATIONS

International Search Report and Written Opinion of International Application No. PCT/CN2020/111521, mailed May 26, 2021, 13 pages.
(Continued)

*Primary Examiner* — Warner Wong
(74) *Attorney, Agent, or Firm* — Finnegan, Henderson, Farabow, Garrett & Dunner, L.L.P.

(57) ABSTRACT

A sidelink communication method is applied to a first device, and includes: determining a first condition being met, the first condition representing occurrence of collision of selected resources between different devices; and in response to determining the first condition being met, sending first indication information, the first indication information indicating removal of resource collision.

18 Claims, 5 Drawing Sheets

(51) Int. Cl.
*H04W 76/23* (2018.01)
*H04W 72/25* (2023.01)
*H04W 72/40* (2023.01)

(58) Field of Classification Search
CPC ..... H04W 76/10; H04W 76/14; H04W 72/00; H04W 72/02; H04W 72/04453; H04W 72/20; H04W 72/25; H04W 72/40; H04W 74/0841; H04L 2012/5631
See application file for complete search history.

(56) References Cited

U.S. PATENT DOCUMENTS

| | | | | |
|---|---|---|---|---|
| 2017/0251487 | A1* | 8/2017 | Kalhan | H04W 28/16 |
| 2019/0021111 | A1* | 1/2019 | Tang | H04W 24/00 |
| 2019/0075603 | A1 | 3/2019 | Hong et al. | |
| 2020/0396734 | A1* | 12/2020 | Li | H04W 56/0005 |
| 2021/0136744 | A1* | 5/2021 | Lu | H04W 72/20 |
| 2021/0227602 | A1* | 7/2021 | Li | H04W 76/14 |
| 2022/0030598 | A1* | 1/2022 | Li | H04W 72/0446 |
| 2022/0030603 | A1* | 1/2022 | Sarkis | H04L 1/1887 |
| 2022/0417910 | A1* | 12/2022 | Lin | H04W 72/0453 |
| 2023/0156785 | A1* | 5/2023 | Yao | H04W 24/10 370/329 |
| 2023/0254842 | A1* | 8/2023 | Zhou | H04W 72/02 370/329 |
| 2023/0276486 | A1* | 8/2023 | Miao | H04W 76/14 370/329 |

FOREIGN PATENT DOCUMENTS

| | | |
|---|---|---|
| CN | 109691146 A | 4/2019 |
| WO | WO 2019088779 A1 | 5/2019 |
| WO | WO 2020015256 A1 | 1/2020 |

OTHER PUBLICATIONS

Examination report for India Application No. 202347006851, issued on Jul. 21, 2023, 7 pages.

Extended European Search Report issued in Application No. 20950680.7 dated Apr. 18, 2024, 10 pages.

Qualcomm Incorporated, "Reliability and Latency Enhancements for Mode 2", 3GPP TSG RAN WG1 Meeting #102-e, R1-2006829, Aug. 17-28, 2020, 9 pages.

* cited by examiner

SIDELINK COMMUNICATION METHODS, SIDELINK COMMUNICATION APPARATUS, AND STORAGE MEDIUM

CROSS-REFERENCE TO RELATED APPLICATION

This application is a U.S. national stage application of International Application No. PCT/CN2020/111521, filed on Aug. 26, 2020, the entire content of which is incorporated herein by reference.

FIELD

The present disclosure relates to the technical field of communication, and in particular, to a sidelink communication method, a sidelink communication apparatus, and a storage medium.

BACKGROUND

Continuous emergence of new-generation Internet applications puts forward higher requirements for wireless communication technology and drives continuous evolution of the wireless communication technology to meet the application needs.

With the development of new-generation 5G mobile communication technology, a 5G new radio (NR) technology is used in 3GPP Rel-16 to support sidelink communication services and scenarios. For example, new vehicle to everything (V2X) communication services and scenarios are supported.

In the related art, user equipment A for sidelink communication may send a resource set to user equipment B whose resource selection manner is Mode2, and the user equipment B takes it into account when selecting resources for its own data transmission. Coordination of resources between user equipment is required, but no solution of coordination exists in the related art.

SUMMARY

According to a first aspect of the present disclosure, a sidelink communication method applied to a first device is provided. The sidelink communication method includes: determining a first condition being met, the first condition representing occurrence of collision of selected resources between different devices; and in response to determining the first condition being met, sending first indication information, the first indication information indicating removal of resource collision.

According to a second aspect of the present disclosure, a sidelink communication method applied to a second device is provided. The sidelink communication method includes: receiving first indication information, the first indication information being triggered by a first device when it is determined that a first condition is met, and the first indication information indicating removal of resource collision; and selecting resources based on the first indication information.

According to a third aspect of the present disclosure, a sidelink communication apparatus is provided. The sidelink communication apparatus: a processor, and a memory configured to store a processor-executable instruction, in which the processor is configured to perform the sidelink communication method in the first aspect.

BRIEF DESCRIPTION OF DRAWINGS

The accompanying drawings, which are incorporated into and constitute a part of this specification, illustrate embodiments consistent with the present disclosure and, together with the specification, serve to explain the principles of the present disclosure.

DETAILED DESCRIPTION

Embodiments will be described in detail, with examples thereof illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure. Instead, they are merely examples of devices and methods consistent with some aspects of the present disclosure.

Figure 1:
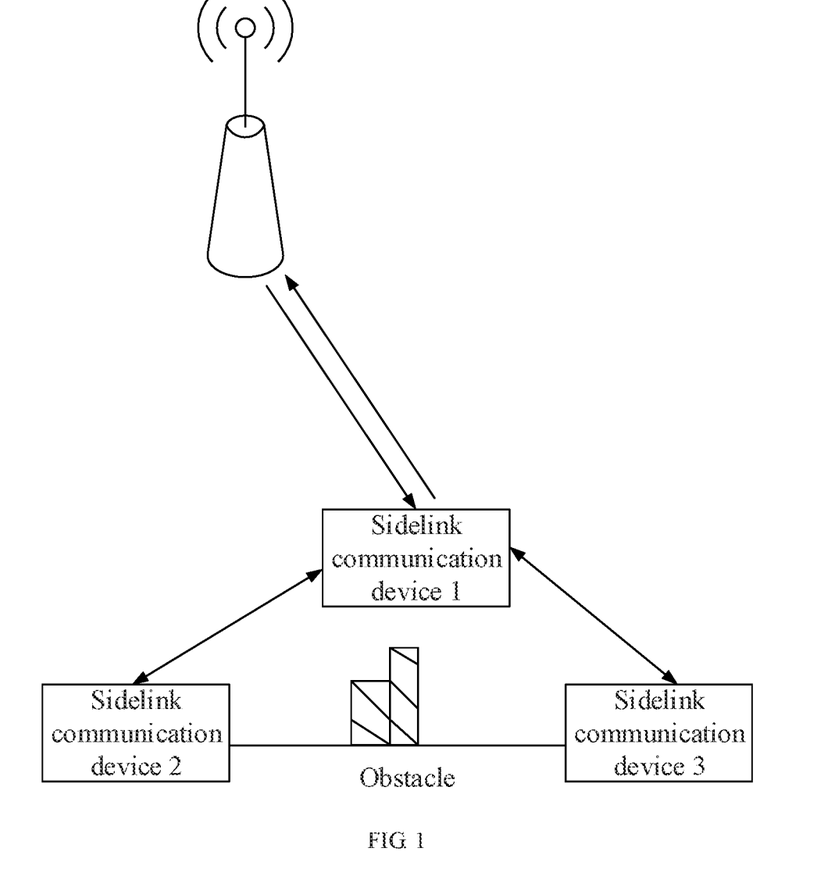
FIG. 1 is an architectural diagram of a sidelink communication system according to an embodiment.

A sidelink communication method according to embodiments of the present disclosure is applicable to a sidelink communication system shown in FIG. 1. Referring to FIG. 1, in a scenario of sidelink communication between sidelink communication devices, a network device configures a sidelink communication device 1 with a variety of transmission parameters for use in data transmission. The sidelink communication device 1, a sidelink communication device 2, and a sidelink communication device 3 conduct sidelink communication with one another. An obstacle exists between the sidelink communication device 2 and the sidelink communication device 3. Links for communication between the network device and the sidelink communication devices are uplinks and downlinks. Links between the sidelink communication devices are sidelinks.

In the present disclosure, a communication scenario of direction communication between the sidelink communication devices may also be a V2X service scenario. V denotes a vehicle-mounted device, and X denotes any object that interacts with the vehicle-mounted device. Currently, X mainly includes vehicle-mounted devices, pedestrians, traffic roadside infrastructure, and networks. Information interaction modes of the V2X include interaction of vehicle to vehicle (V2V), vehicle to infrastructure (V2I), vehicle to pedestrian (V2P), and vehicle to network (V2N).

Internet of vehicles (IoV) can effectively improve traffic safety, improve traffic efficiency, and enrich people's travel experience. By using existing cellular communication technology to support IoV communication, existing deployment of base stations can be effectively utilized, and device overhead can be reduced, which is more conducive to providing services with guaranteed quality of service (QoS) to meet requirements of IoV services. Therefore, in Long Term Evolution (LTE) Rel-14/15, support of the V2X communication by cellular networks, that is, cellular-vehicle to everything (C-V2X), is provided. In the C-V2X, communication between a vehicle-mounted device and other devices can be transferred through a base station and a core network, that is, an uplink and a downlink between the terminal device and the base station in the existing cellular network are used for communication; or communication may also be conducted directly through sidelinks between the devices. Compared with Uu interface communication, sidelink communication has characteristics of short delay and low overhead, which is very suitable for direct communication between vehicle-mounted devices and other peripheral devices that are geographically close.

With the development of new-generation 5G mobile communication technology, a 5G NR technology is used in 3GPP Rel-16 to support new V2x communication services and scenarios, such as Vehicles Platooning, Extended Sensors, Advanced Driving, and remote driving. In general, a 5G V2x sidelink can provide a higher communication rate, shorter communication delay, and more reliable communication quality.

The communication scenario of direct communication between the sidelink communication devices may also be a device to device (D2D) communication scenario. In embodiments of the present disclosure, the sidelink communication devices for direct communication may include various types of hand-held devices, vehicle-mounted devices, wearable devices, and computing devices with a wireless communication function, or other processing devices connected to a wireless modem, and various forms of user equipment (UEs), mobile stations (MSs), terminals, terminal equipment, and the like. For ease of description, in embodiments of the present disclosure, the following descriptions are based on an example in which the sidelink communication devices are UEs.

The following optimization may be studied in R17 Sidelink Enhancement approved by 3GPP. One (e.g., the sidelink communication device 2) of the sidelink communication devices for sidelink communication may send a resource set to another UE (e.g., the sidelink communication device 3) whose resource selection mode is Mode2, and the UE (e.g., the sidelink communication device 3) whose resource selection mode is Mode2 takes this into account when selecting resources for its own data transmission.

However, a relationship between the sidelink communication device 2 and the sidelink communication device 3, under what condition the sidelink communication device 2 performs coordination, and how the sidelink communication device 3 uses an indication of the sidelink communication device 2 all remain to be studied.

A possible use scenario for inter-user coordination is to solve a hidden terminal problem. That is, the sidelink communication device 2 and the sidelink communication device 3 cannot monitor sidelink transmission of the opposite side, but the sidelink communication device 1 can receive sidelink transmission of the sidelink communication device 2 and the sidelink communication device 3. The sidelink communication device 2 and the sidelink communication device 3, when selecting identical time resources and/or frequency resources, cannot find resource collision therebetween by monitoring. However, if one of the sidelink communication target UEs includes the sidelink communication device 1, it may lead to receiving failure of the sidelink communication device 1. The problem of the receiving failure of the sidelink communication device 1 may be solved by coordinating resource selection of the sidelink communication device 2 and the sidelink communication device 3 through the sidelink communication device 1.

Embodiments of the present disclosure provides a sidelink communication method. When it is determined that a condition that selected resources between different devices collide is met, indication information that is used to indicate removal of resource collision is sent, so as to coordinate resources and remove the resource collision when resources selected by the different devices collide in hidden terminal scenarios.

In the embodiments of the present disclosure, the condition that selected resources between different devices collide is represented by a first condition, and removal of resource collision is indicated through first indication information.

Figure 2:
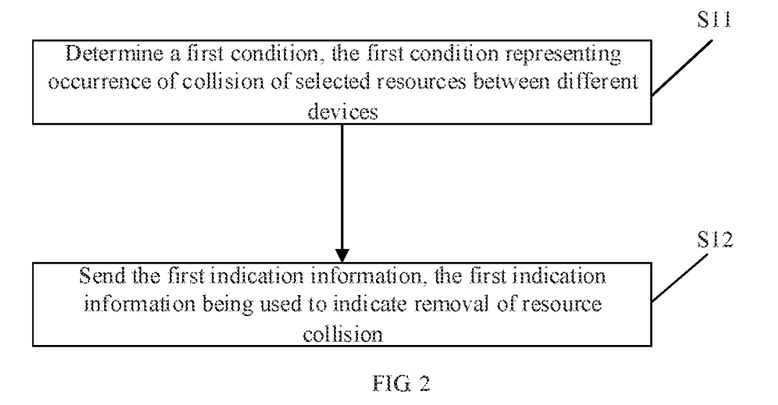
FIG. 2 is a flowchart of a sidelink communication method according to an embodiment.

FIG. 2 is a flowchart of a sidelink communication method according to an embodiment. As shown in FIG. 2, the sidelink communication method is applied to a first device. The first device may be a device such as a terminal configured for sidelink communication. The sidelink communication method includes the following steps:

In step S11: a first condition is determined, the first condition representing occurrence of collision of selected resources between different devices.

In step S12: the first indication information is sent, the first indication information being used to indicate removal of resource collision.

In the embodiments of the present disclosure, when it is determined that the first condition that represents occurrence of collision of selected resources between different devices is met, the first device is triggered to send the first indication information that is used to indicate removal of resource collision.

In the embodiments of the present disclosure, the collision of resources may be understood as that the resources overlap or the resources are identical.

Further, in the embodiments of the present disclosure, the collision of resources may be understood as collision of all or some of time resources, frequency resources, code-domain resources, or space-domain resources. For example, overlap of the time resources, frequency resources, code-domain resources, or space-domain resources may be understood as overlap of some or all of the resources.

In the embodiments of the present disclosure, an implementation process of determining the first condition is described first.

In an implementation, the first condition in the embodiments of the present disclosure includes the first device monitoring overlap of reserved resources of at least two other devices different from the first device.

The reserved resources may be determined through sidelink control information (SCI). For example, first UE monitors SCI from other different UEs with mutually overlapping time and frequency resources reserved, and the first UE may be triggered to send indication information that is used to indicate removal of resource collision.

It may be understood that, in the embodiments of the present disclosure, the overlap of the reserved resources of the at least two other devices includes partial overlap or complete overlap. The reserved resources may be time resources, frequency resources, code-domain resources, or space-domain resources.

In another implementation, the first condition in the embodiments of the present disclosure includes a measurement value of reference signal received power (RSRP) of one or more devices with overlap of reserved resources being greater than a specified threshold.

In the embodiments of the present disclosure, the specified threshold may be determined by downlink control information or pre-configured.

On the one hand, the first device receives downlink control information sent by a network device (e.g., a base station), and determines, through the received downlink control information, a specified threshold for determining whether the measurement value of RSRP meets the first condition. On the other hand, the first device may obtain, according to pre-configuration information, the specified threshold for determining whether the measurement value of RSRP meets the first condition.

Further, in the embodiments of the present disclosure, the specified threshold for determining whether the measurement value of RSRP meets the first condition may be correlated with a sidelink data transmission priority indicated by the SCI. A correspondence exists between the specified threshold and the sidelink data transmission priority indicated by the SCI. In an example, when the priority is i, the threshold is Threshold_i, and when the priority is j, the threshold is Threshold_j. It is assumed that UE monitors two pieces of downlink control information with overlapping time and frequency resources reserved, for example, downlink control information 1 and downlink control information 2, sidelink transmission priorities indicated by the two pieces of information are priority 1 and priority 2, and corresponding thresholds are T1 and T2 respectively. Then, a measurement value of sidelink reference signal received power (S-RSRP) corresponding to the downlink control information 1 is required to be greater than T1, and a measurement value of S-RSRP corresponding to the downlink control information 2 is required to be greater than T2.

Overlap of the reserved resources may be determined by monitoring the downlink control information. If different devices monitor downlink control information with overlap of reserved resources and a measurement value of RSRP corresponding to the downlink control information exceeds the specified threshold, it may be determined that the first condition is met. In an example, for two pieces of monitored SCI with overlapping time and frequency resources reserved, if a measurement value of S-RSRP corresponding thereto exceeds a given S-RSRP threshold, it may be determined that the first condition for triggering sending first indication information is met. The given S-RSRP threshold may be obtained by pre-configuration or base station downlink signaling configuration.

In yet another implementation, the first condition includes that: the first device is target UE using reserved resources to receive data or is one of target UEs using reserved resources to receive data. For example, identifiers of target UEs indicated by at least one of the downlink control information with overlap of reserved resources include the first device. That is, the first device is target UE indicated by the downlink control information, or in the case of broadcast or multicast, the first device is one of the target UEs indicated by the downlink control information.

In yet another implementation, the first condition includes that reserved resources with resource collision have resource reservation cycles. Resource reservation cycles indicated by at least two pieces of downlink control information with overlap of reserved resources are not 0. Additionally or alternatively, the first condition includes that a particular relationship exists between the resource reservation cycles of the reserved resources with resource collision. The particular relationship is determined based on an indication of downlink control information; or the particular relationship is determined according to pre-configuration information. In an example, an integer multiple relationship exists between the resource reservation cycles. For example, the resource reservation cycle indicated by one piece of the downlink control information may be evenly divided by the resource reservation cycle indicated by the other piece of the downlink control information.

In the embodiments of the present disclosure, the sending of the first indication information is described below.

In an implementation of the embodiments of the present disclosure, the first indication information may be sent through downlink control information.

In the embodiments of the present disclosure, the first indication information may include one or more of the following items: an indication for removing resource collision; an indication of time resources and/or frequency resources with resource collision; and an indication of an identifier of UE with resource collision.

In an example, removal of resource collision is indicated in the downlink control information. Additionally or alternatively, time resources and/or frequency resources with resource collision are indicated in the downlink control information. Additionally or alternatively, an identifier of UE with resource collision is indicated in the downlink control information.

In an aspect of the embodiments of the present disclosure, the downlink control information includes a first indication field, the first indication field being used to indicate the first indication information. For example, in the embodiments of the present disclosure, a field for resource reservation in a first part of the downlink control information may be reused to indicate the first indication information. In another aspect of the embodiments of the present disclosure, a new second-part downlink control information format is designed, so as to indicate the first indication information in the second-part downlink control information format. That is, the SCI includes a first SCI format, the first SCI format being used to indicate the first indication information.

In the embodiments of the present disclosure, when the identifier of the UE with resource collision is indicated in the downlink control information, on the one hand, the identifier of the UE includes an identifier of UE included in the monitored SCI, and resources reserved in the SCI include resources at least partially colliding. In another aspect, the identifier of the UE includes an identifier of source UE, or an identifier of source UE and an identifier of destination UE. In an example, UE sending downlink control information with reservation configuration is indicated by using the identifier of the source UE, or the identifier of the source UE and the identifier of the destination UE used in resource reservation of the downlink control information with resource reservation collision.

In the embodiments of the present disclosure, when the identifier of the UE with resource collision is indicated in the downlink control information, the identifier of the UE includes an identifier of UE conducting sidelink communication with the first device, and resources reserved by the UE include resources at least partially colliding. In an example, downlink control information of target UE is selected from the downlink control information with resource reservation collision that triggers removal of resource collision. Downlink control information including the first indication information is sent to the UE sending the downlink control information, to indicate that the UE sending the downlink control information is a target device at a receiving end.

During implementation of the embodiments of the present disclosure, the above sidelink communication method may be enabled or disabled. That is, the operation of determining a first condition and/or the operation of sending first indication information may be executed or not executed.

In an implementation, the first device may receive downlink control information sent by a network device, the downlink control information including an indication for determining whether to execute the operations of determining a first condition and sending first indication information. If the downlink control information includes an indication for determining execution of the operations of determining a first condition and sending first indication information, the first device determines, according to the downlink control information, the execution of the operations of determining a first condition and sending first indication information. If the downlink control information includes an indication for determining non-execution of the operations of determining a first condition and sending first indication information, the first device determines, according to the downlink control information, the non-execution of the operations of determining a first condition and sending first indication information.

In another implementation, the first device may determine including pre-configuration information for indicating whether to execute the operations of determining a first condition and sending first indication information, and determine, according to the pre-configuration information, whether to execute the operations of determining a first condition and sending first indication information. If the pre-configuration information includes an indication for determining execution of the operations of determining a first condition and sending first indication information, the first device determines, according to the pre-configuration information, the execution of the operations of determining a first condition and sending first indication information. If the pre-configuration information includes an indication for determining non-execution of the operations of determining a first condition and sending first indication information, the first device determines, according to the pre-configuration information, the non-execution of the operations of determining a first condition and sending first indication information.

In the embodiments of the present disclosure, the first device sends the first indication information when it is determined that the first condition is met, so as to indicate removal of resource collision. A device receiving the first indication information may coordinate resources to remove resource collision when selecting resources.

Figure 3:
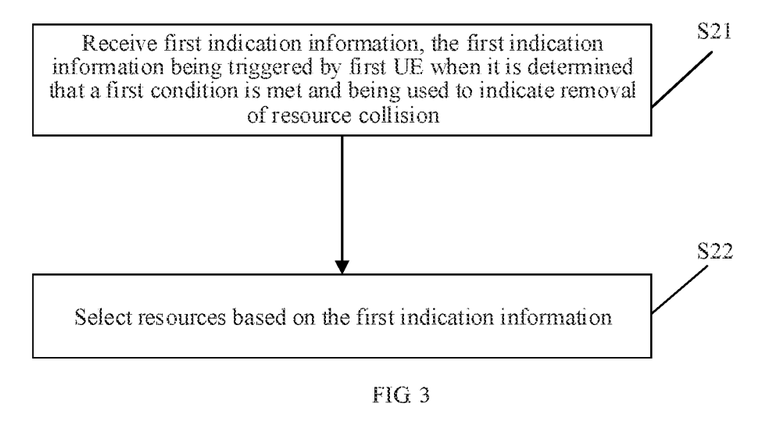
FIG. 3 is a flowchart of a sidelink communication method according to an embodiment.

FIG. 3 is a flowchart of a sidelink communication method according to an embodiment. As shown in FIG. 3, the sidelink communication method is applied to a second device. The second device may be a device such as a terminal configured for sidelink communication. The sidelink communication method includes the following steps.

In step S21: first indication information is received, the first indication information being triggered by first UE when it is determined that a first condition is met and the first indication information being used to indicate removal of resource collision.

In step S22: resources are selected based on the first indication information.

In the embodiments of the present disclosure, the second device may receive the first indication information based on SCI.

In an aspect of the embodiments of the present disclosure, the downlink control information includes a first indication field, the first indication field being used to indicate the first indication information. For example, in the embodiments of the present disclosure, a field for resource reservation in a first part of the downlink control information may be reused to indicate the first indication information. In another aspect of the embodiments of the present disclosure, a new second-part downlink control information format is designed, so as to indicate the first indication information in the second-part downlink control information format. That is, the SCI includes a first SCI format, the first SCI format being used to indicate the first indication information.

In the embodiments of the present disclosure, when the resources are selected based on the first indication information, on the one hand, if time frequency resources reserved by the second device overlap with time resources and/or frequency resources with resource collision in the first indication information, and/or if an identifier of UE indicated in the first indication information is the same as an identifier of UE used by second UE to conduct sidelink communication, the second UE re-selects time frequency resources. On the other hand, if time frequency resources reserved by the second device overlap with time resources and/or frequency resources with resource collision in the first indication information, and if an identifier of UE used by second UE to conduct sidelink communication does not include an identifier of UE indicated in the first indication information, the second UE re-selects time frequency resources.

In the embodiments of the present disclosure, the first condition as referred to during the implementation of the sidelink communication method performed by the second device may be obtained with reference to the first condition as referred to during the implementation of the sidelink communication method performed by the first device. Details are not described in detail herein again. For example, in an implementation, the first condition includes one or more of the following items: the first device monitoring overlap of reserved resources of at least two other devices different from the first device. A measurement value of RSRP of one or more devices with overlap of reserved resources is greater than a specified threshold. The first device is target UE using reserved resources to receive data, or one of target UEs using reserved resources to receive data.

In an implementation, the specified threshold is obtained according to an indication of downlink control information; or the specified threshold is obtained according to pre-configuration information.

In an implementation, reserved resources with resource collision have resource reservation cycles, and/or a particular relationship exists between the resource reservation cycles of the reserved resources with resource collision. An integer multiple relationship exists between the resource reservation cycles. In an implementation, the particular relationship is determined based on an indication of downlink control information; or the particular relationship is determined according to pre-configuration information.

In the embodiments of the present disclosure, the first indication information includes one or more of the following items: an indication for removing resource collision; an indication of time resources and/or frequency resources with resource collision: and an indication of an identifier of UE with resource collision.

In an example, when the identifier of the UE with resource collision is indicated in the downlink control information, in an implementation, the identifier of the UE includes an identifier of UE included in the monitored SCI, and resources reserved in the SCI include resources at least partially colliding. The identifier of the UE includes an identifier of source UE, or an identifier of source UE and an identifier of destination UE. In another implementation, the identifier of the UE includes an identifier of UE conducting sidelink communication with the first device, and resources reserved by the UE include resources at least partially colliding.

In an example, if UE sending downlink control information with reservation configuration is indicated by using the identifier of the source UE, or the identifier of the source UE and the identifier of the destination UE used in resource reservation of the downlink control information with resource reservation collision, on the one hand, the indicated UE is required to re-select resources to prevent collision. On the other hand, the indicated UE is not required to re-select resources. Another UE, if finding that reserved time frequency resources overlap with time frequency resources with resource collision indicated in the downlink control information, is required to re-select resources.

With the sidelink communication method according to the embodiments of the present disclosure, when the first device determines that the first condition that selected resources between different devices collide is met, the first device sends first indication information that is used to indicate removal of resource collision, so that the second device coordinates resources and removes the resource collision when resources selected by the second device collide in hidden terminal scenarios.

Based on the same concept, an embodiment of the present disclosure further provides a sidelink communication apparatus.

It may be understood that, in order to realize the above functions, the sidelink communication apparatus according to the embodiments of the present disclosure includes hardware structures and/or software modules corresponding to the functions. In combination with the units and algorithm steps of the examples disclosed In the embodiments of the present disclosure, the embodiments of the present disclosure may be implemented in the form of hardware or a combination of hardware and computer software. Whether a certain function is executed by hardware or by computer software driving hardware depends on specific applications and design constraints of the technical solution. Those skilled in the art may use different methods to implement the described functions for each specific application, but it should not be considered that such implementation goes beyond the scope of the technical solution of the embodiments of the present disclosure.

Figure 4:
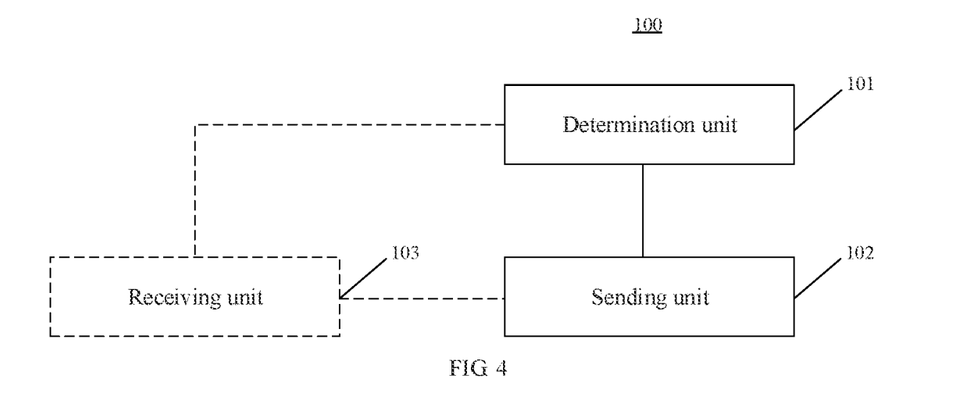
FIG. 4 is a block diagram of a sidelink communication apparatus according to an embodiment.

FIG. 4 is a block diagram of a sidelink communication apparatus according to an embodiment. Referring to FIG. 4, a sidelink communication apparatus 100 is applied to a first device, and includes a determination unit 101 and a sending unit 102.

The determination unit 101 is configured to determine a first condition, the first condition representing occurrence of collision of selected resources between different devices. The sending unit 102 is configured to send first indication information, the first indication information being used to indicate removal of resource collision.

In an implementation, the first condition includes that the first device monitors overlap of reserved resources of at least two other devices different from the first device.

In an implementation, the first condition includes that a measurement value of RSRP of one or more devices with overlap of reserved resources is greater than a specified threshold.

In an implementation, the determination unit 101 is further configured to: receive downlink control information sent by a network device, the specified threshold being obtained according to an indication of the downlink control information; or obtain the specified threshold according to pre-configuration information.

In an implementation, the first indication information includes one or more of the following items: an indication for removing resource collision; an indication of time resources and/or frequency resources with resource collision; and an indication of an identifier of UE with resource collision.

In an implementation, the sending unit 102 sends the first indication information based on SCI.

In an implementation, the SCI includes a first indication field, the first indication field being used to indicate the first indication information.

In an implementation, the SCI includes a first SCI format, the first SCI format being used to indicate the first indication information.

In an implementation, the identifier of the UE includes an identifier of UE included in the monitored SCI, and resources reserved in the SCI include resources at least partially colliding.

In an implementation, the identifier of the UE includes an identifier of source UE, or an identifier of source UE and an identifier of destination UE.

In an implementation, the identifier of the UE includes an identifier of UE conducting sidelink communication with the first device, and resources reserved by the UE include resources at least partially colliding.

In an implementation, the sidelink communication apparatus 100 further includes a receiving unit 103. The receiving unit 103 is configured to receive downlink control information sent by a network device, the downlink control information including an indication for determining whether to execute the operations of determining a first condition and sending first indication information. The determination unit 101 is further configured to determine, according to the downlink control information, the execution of the operations of determining a first condition and sending first indication information; or determine including pre-configuration information for indicating whether to execute the operations of determining a first condition and sending first indication information, and determine, according to the pre-configuration information, the execution of the operations of determining a first condition and sending first indication information.

In an implementation, the first condition includes that: the first device is target UE using reserved resources to receive data or is one of target UEs using reserved resources to receive data.

In an implementation, the first condition includes that: reserved resources with resource collision have resource reservation cycles, and/or a particular relationship exists between the resource reservation cycles of the reserved resources with resource collision.

In an implementation, an integer multiple relationship exists between the resource reservation cycles.

In an implementation, the particular relationship is determined based on an indication of downlink control information; or the particular relationship is determined according to pre-configuration information.

Figure 5:
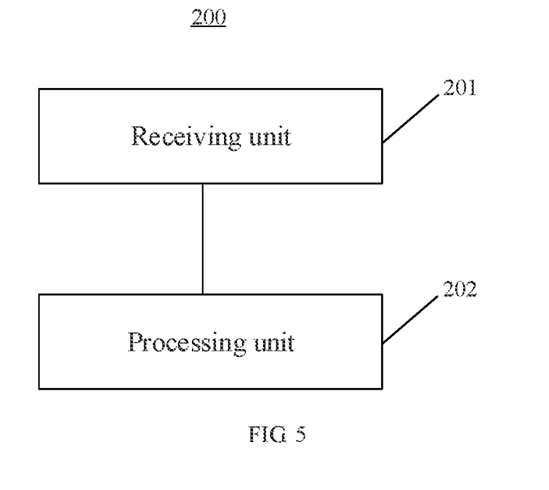
FIG. 5 is a block diagram of a sidelink communication apparatus according to an embodiment.

FIG. 5 is a block diagram of a sidelink communication apparatus according to an embodiment. Referring to FIG. 5, a sidelink communication apparatus 200 is applied to a second device, and includes a receiving unit 201 and a processing unit 202.

The receiving unit 201 is configured to receive first indication information, the first indication information being triggered by first UE when it is determined that a first condition is met and the first indication information being used to indicate removal of resource collision. The processing unit 202 is configured to select resources based on the first indication information.

In an implementation, the receiving unit 201 receives first indication information in the following manner, receiving the first indication information based on SCI.

In an implementation, the SCI includes a first indication field, the first indication field being used to indicate the first indication information.

In an implementation, the SCI includes a first SCI format, the first SCI format being used to indicate the first indication information.

In an implementation, the processing unit 202 selects the resources based on the first indication information in the following manner: re-selecting, by second UE, time frequency resources, when reserved time frequency resources overlap with time resources and/or frequency resources with resource collision in the first indication information, and/or when an identifier of UE indicated in the first indication information is the same as an identifier of UE used by the second UE for sidelink communication.

In an implementation, the processing unit 202 selects the resources based on the first indication information in the following manner: re-selecting, by second UE, time frequency resources, when reserved time frequency resources overlap with time resources and/or frequency resources with resource collision in the first indication information, and when an identifier of UE used by the second UE for sidelink communication does not include an identifier of UE indicated in the first indication information.

In an implementation, the first indication information includes one or more of the following items: an indication for removing resource collision; an indication of time resources and/or frequency resources with resource collision; and an indication of an identifier of UE with resource collision.

In an implementation, the first condition includes that the first device monitors overlap of reserved resources of at least two other devices different from the first device.

In an implementation, the first condition includes that a measurement value of RSRP of one or more devices with overlap of reserved resources is greater than a specified threshold.

In an implementation, the specified threshold is obtained according to an indication of downlink control information; or the specified threshold is obtained according to pre-configuration information.

In an implementation, the first condition includes that: the first device is target UE using reserved resources to receive data or is one of target UEs using reserved resources to receive data.

In an implementation, the first condition includes that: reserved resources with resource collision have resource reservation cycles, and/or a particular relationship exists between the resource reservation cycles of the reserved resources with resource collision.

In an implementation, an integer multiple relationship exists between the resource reservation cycles.

In an implementation, the particular relationship is determined based on an indication of downlink control information; or the particular relationship is determined according to pre-configuration information.

Regarding the apparatuses in the above embodiments, specific manners in which the modules perform operations have been described in the method embodiments, and will not be elaborated herein.

Figure 6:
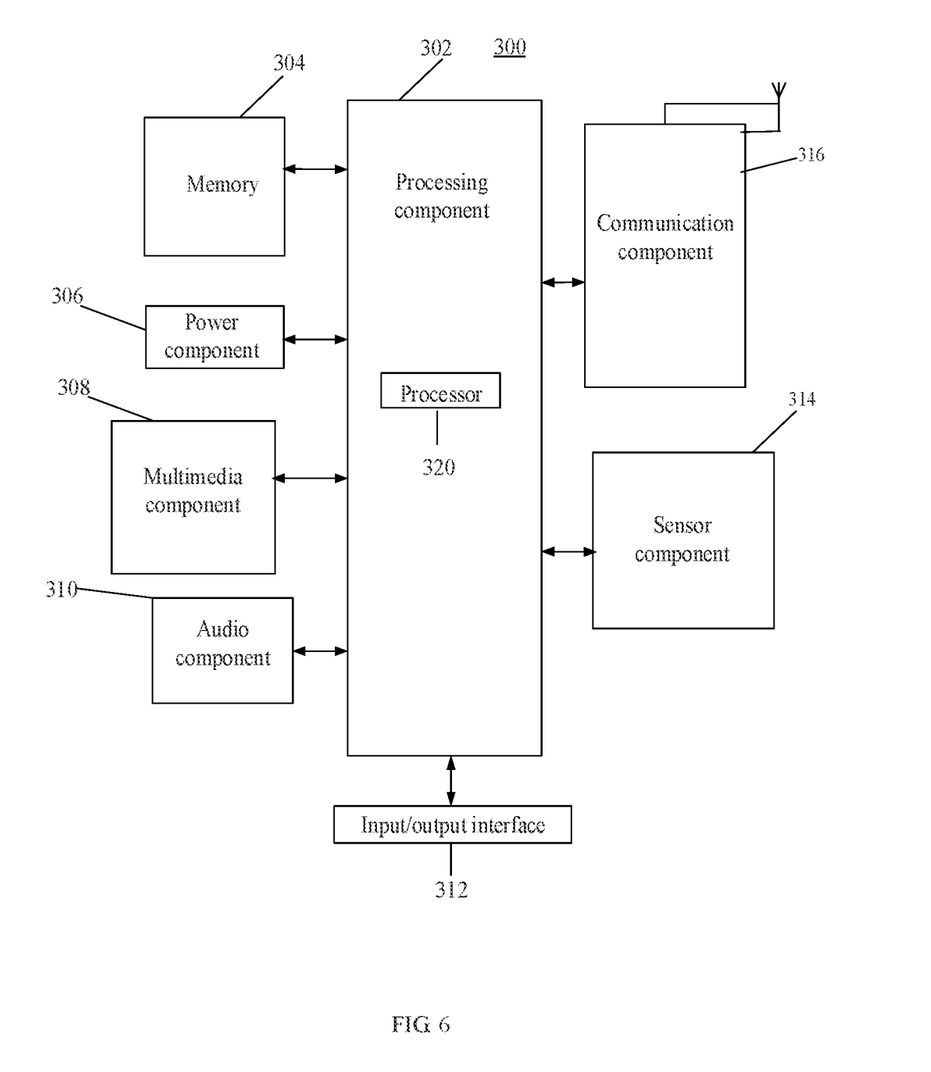
FIG. 6 is a block diagram of a device for sidelink communication according to an embodiment.

FIG. 6 is a block diagram of a device 300 for sidelink communication according to an embodiment. For example, the device 300 may be the first device or the second device mentioned in the embodiments of the present disclosure. For example, the device 300 may be a mobile phone, a computer, a digital broadcast terminal, a messaging device, a gaming console, a tablet, a medical device, exercise equipment, a personal digital assistant and the like.

Referring to FIG. 6, the device 300 may include one or more following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as operations associated with display, telephone calls, data communications, camera operations, and recording operations. The processing component 302 may include one or more processors 320 to execute instructions to perform all or some of the steps in the methods described above. Moreover, the processing component 302 may include one or more modules which facilitate interaction between the processing component 302 and other components. For example, the processing component 302 may include a multimedia module to facilitate interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 306 provides power to various components of the device 300. The power component 306 may include a power management system, one or more power sources, and any other components associated with generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. The front camera and/or the rear camera may receive external multimedia data while the device 300 is in an operation mode, such as a photographing mode or a video mode. Each of the front camera and the rear camera may be a fixed optical lens system or have a focal length and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal may be further stored in the memory 304 or transmitted via the communication component 316. In some embodiments, the audio component 310 further includes a speaker to output audio signals.

The I/O interface 312 provides an interface between the processing component 302 and a peripheral interface module. The peripheral interface module may be a keyboard, a click wheel, buttons, or the like. The buttons may include, but are not limited to, a home button, a volume button, a starting button, and a locking button.

The sensor component 314 includes one or more sensors to provide state assessments of various aspects of the device 300. For example, the sensor component 314 may detect an on/off state of the device 300 and relative positioning of components. The components may be a display and a keypad of the device 300. The sensor component 314 may further detect a change in the position of the device 300 or a component of the device 300, presence or absence of the user's contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an accelerometer sensor, a gyroscope sensor, a magnetic sensor, a pressure sensor or a temperature sensor.

The communication component 316 is configured to facilitate wired or wireless communication between the device 300 and other devices. The device 300 may access a wireless network based on a communication standard, such as Wi-Fi, 2G or 3G. or a combination thereof. In an embodiment, the communication component 316 receives a broadcast signal or broadcast related information from an external broadcast management system via a broadcast channel. In an embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In embodiments, a non-transitory computer-readable storage medium including instructions, for example, a memory 304 including instructions, is further included. The instructions may be performed by a processor 320 of the device 300 to complete the above method. For example, the non-transitory computer-readable storage medium may be a ROM, a RAM, a CD-ROM, a magnetic tape, a floppy disc, an optical data storage device or the like.

Figure 7:
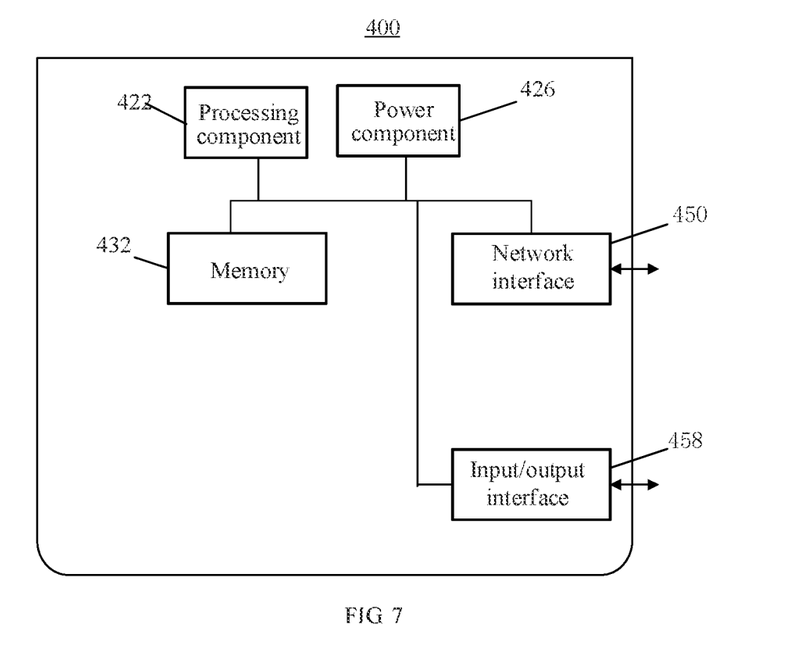
FIG. 7 is a block diagram of a device for sidelink communication according to an embodiment.

FIG. 7 is a block diagram of a device 400 for sidelink communication according to an embodiment. For example, the device 400 may be the first device or the second device mentioned in the embodiments of the present disclosure, which is, for example, provided as a server. Referring to FIG. 7, the device 400 includes a processing component 422 further including one or more processors, and a memory resource represented by a memory 432 storing instructions executable by the processing component 422, for example, an application program. The application program stored in the memory 432 may include one or more modules each corresponding to a set of instructions. In addition, the processing component 422 is configured to execute the instructions to execute the above method.

The device 400 may further include a power component 426 configured to execute power management of the device 400, a wired or wireless network interface 450 configured to connect the device 400 to a network, and an I/O interface 458. The device 400 may be operated based on an operating system stored in the memory 432, for example, Windows Server™, Mac OS X™, Unix™, Linux™, FreeBSD™ or the like.

In embodiments, a non-transitory computer-readable storage medium including instructions, for example, a memory 432 including instructions, is further included. The instructions may be performed by a processor 422 of the device 400 to complete the above method. For example, the non-transitory computer-readable storage medium may be a ROM, a RAM, a CD-ROM, a magnetic tape, a floppy disc, an optical data storage device or the like.

It may be further understood that "a plurality of" in the present disclosure indicates two or more, and other quantifiers are similar thereto. The term "and/or" describes an association relationship for describing associated objects, indicating that three relationships may exist. For example. A and/or B may represent the following three cases: only A exists; both A and B exist; and only B exists. The character "/" generally indicates that the associated objects before and after are in an "or" relationship. The singular forms "a/an", "said", and "the" are also intended to include plural forms, unless otherwise clearly specified in the context.

It may be further understood that the terms such as "first" and "second" are used to describe various information, but the information should not be limited to these terms. These terms are only used to distinguish the same type of information from each other, and do not indicate a specific order or degree of importance. In fact, expressions such as "first" and 'second' may be used interchangeably. For example, without departing from the scope of the present disclosure, the first information may also be referred to as second information, and similarly, the second information may also be referred to as first information.

It may be further understood that, although the operations are described in a specific order in the drawings in the embodiments of the present disclosure, it should not be understood that the operations are required to be performed in the shown specific order or in a serial order, or all the shown operations are required to be performed to get a desired result. In specific circumstances, multitasking and parallel processing may be advantageous.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A sidelink communication method, performed by a first device and comprising:
   determining a first condition being met, the first condition representing occurrence of collision of selected resources between different devices; and
   in response to determining the first condition being met, sending first indication information, the first indication information indicating removal of resource collision;
   wherein the method further comprises at least one of:
   receiving downlink control information sent by a network device, the downlink control information comprising an indication for determining whether to perform the determining of the first condition being met and the sending of the first indication information, and determining to perform, according to the downlink control information, the determining of the first condition being met and the sending of the first indication information; or
   determining pre-configuration information for indicating whether to perform the determining of the first condition and the sending of the first indication information, and determining to perform, according to the pre-configuration information, the determining of the first condition and the sending of the first indication information.

2. The sidelink communication method according to claim 1, wherein the first condition comprises that the first device monitors overlap of reserved resources of at least two other devices different from the first device.

3. The sidelink communication method according to claim 1, wherein the first indication information comprises one or more of:
   an indication for removing resource collision;
   an indication of time resources with resource collision;
   an indication of frequency resources with resource collision; and
   an indication of an identifier of user equipment with resource collision.

4. The sidelink communication method according to claim 1, wherein sending first indication information comprises:
   sending the first indication information based on sidelink control information.

5. The sidelink communication method according to claim 4, wherein the sidelink control information comprises a first indication field, the first indication field indicating the first indication information.

6. The sidelink communication method according to claim 4, wherein the sidelink control information comprises a first sidelink control information format, the first sidelink control information format indicating the first indication information.

7. The sidelink communication method according to claim 3, wherein the identifier of the user equipment comprises an identifier of user equipment contained in monitored sidelink control information, and resources reserved in the sidelink control information comprise resources at least partially colliding.

8. The sidelink communication method according to claim 7, wherein the identifier of the user equipment comprises at least one of:
   an identifier of source user equipment, or
   an identifier of source user equipment and an identifier of destination user equipment.

9. The sidelink communication method according to claim 7, wherein the identifier of the user equipment comprises an identifier of user equipment conducting sidelink communication with the first device, and resources reserved by the user equipment comprise resources at least partially colliding.

10. The sidelink communication method according to claim 1, wherein the first condition comprises that: the first device is target user equipment using reserved resources to receive data or is one of target user equipment using reserved resources to receive data.

11. A sidelink communication method, performed by a second device and comprising:
    receiving first indication information, the first indication information being triggered by a first device when it is determined that a first condition is met, and the first indication information indicating removal of resource collision; and
    selecting resources based on the first indication information;
    wherein selecting the resources based on the first indication information comprises:
    re-selecting time frequency resources, when reserved time frequency resources overlap with at least one of time resources or frequency resources with resource collision in the first indication information, and when an identifier of user equipment used by the second device for sidelink communication does not comprise an identifier of user equipment indicated in the first indication information.

12. The sidelink communication method according to claim 11, wherein receiving first indication information comprises:
    receiving the first indication information based on sidelink control information.

13. The sidelink communication method according to claim 12, wherein the sidelink control information comprises a first indication field, the first indication field indicating the first indication information.

14. The sidelink communication method according to claim 12, wherein the sidelink control information comprises a first sidelink control information format, the first sidelink control information format indicating the first indication information.

15. The sidelink communication method according to claim 11, wherein selecting resources based on the first indication information comprises at least one of:
    re-selecting time frequency resources, when reserved time frequency resources overlap with at least one of time resources or frequency resources with resource collision in the first indication information, or
    re-selecting time frequency resources, when an identifier of user equipment indicated in the first indication information is the same as an identifier of user equipment used by the second device for sidelink communication.

16. A first device, comprising:
a processor; and
a memory configured to store a processor-executable instruction,
wherein the processor is configured to:
determine a first condition being met, the first condition representing occurrence of collision of selected resources between different devices; and
in response to determining the first condition being met, send first indication information, the first indication information indicating removal of resource collision;
wherein the processor is further configured to perform at least one of:
receiving downlink control information sent by a network device, the downlink control information comprising an indication for determining whether to perform the determining of the first condition being met and the sending of the first indication information, and determining to perform, according to the downlink control information, the determining of the first condition being met and the sending of the first indication information; or determining pre-configuration information for indicating whether to perform the determining of the first condition and the sending of the first indication information, and determining to perform, according to the pre-configuration information, the determining of the first condition and the sending of the first indication information.

17. The sidelink communication method according to claim 1, wherein the first condition comprises that a measurement value of reference signal received power of one or more devices with overlap of reserved resources is greater than a specified threshold.

18. The sidelink communication method according to claim 17, further comprising at least one of:
receiving downlink control information sent by a network device, and obtaining the specified threshold according to an indication of the downlink control information; or
obtaining the specified threshold according to pre-configuration information.

* * * * *